United States Patent
Kondo et al.

[19]

[11] Patent Number: 5,936,941

[45] Date of Patent: *Aug. 10, 1999

[54] COMMUNICATION SYSTEM INCLUDING MANAGEMENT TERMINAL AND PLURALITY OF COMMUNICATION TERMINALS AND ENABLING QUICK MAINTENANCE AND MANAGEMENT

[75] Inventors: Hidefumi Kondo, Nagoya; Ikuro Hibino, Kawasaki, both of Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/626,972

[22] Filed: Apr. 3, 1996

[30] Foreign Application Priority Data

Jun. 16, 1995 [JP] Japan .................................. 7-149888

[51] Int. Cl.⁶ ...................................................... H04J 3/12
[52] U.S. Cl. ............................................ 370/242; 370/384
[58] Field of Search .................................... 370/242, 252, 370/253, 244, 230, 384, 437, 468, 352, 353, 357, 261, 264, 271, 522, 524, 526, 449, 450, 453, 455, 457; 379/90.01, 92.01, 93.14, 93.15, 92.03, 92.04, 219, 230, 242, 257, 258

[56] References Cited

U.S. PATENT DOCUMENTS

| | | | |
|---|---|---|---|
| 4,500,985 | 2/1985 | Chang | 370/244 |
| 4,561,090 | 12/1985 | Turner | 370/244 |
| 4,942,569 | 7/1990 | Maeno | 370/230 |
| 5,291,481 | 3/1994 | Doshi et al. | 370/230 |
| 5,566,223 | 10/1996 | Taguchi | 370/244 |
| 5,577,046 | 11/1996 | Diachina et al. | 370/252 |

*Primary Examiner*—Chi H. Pham
*Assistant Examiner*—Kwang B. Yao
*Attorney, Agent, or Firm*—Helfgott & Karas, PC.

[57] ABSTRACT

A communication system including a management terminal and a plurality of communication terminals connected to a communication network via network termination unit etc., wherein the management terminal instructs the type of the status information and requests transmission of the status information or suspension of transmission of the same to the communication terminals by the user-user information in the call setup message and wherein the communication terminals receiving the request for transmission extract and hold the address information indicating the management terminal contained in the call setup message and, when detecting an occurrence of a failure or other specific phenomenon, transmit the indicated type of the status information to the management terminal by the user-user information in the call setup message while defining address information indicating the management terminal as the termination address information. Thus, only the desired type of the status information is collected and therefore quick maintenance and management are made possible.

9 Claims, 18 Drawing Sheets

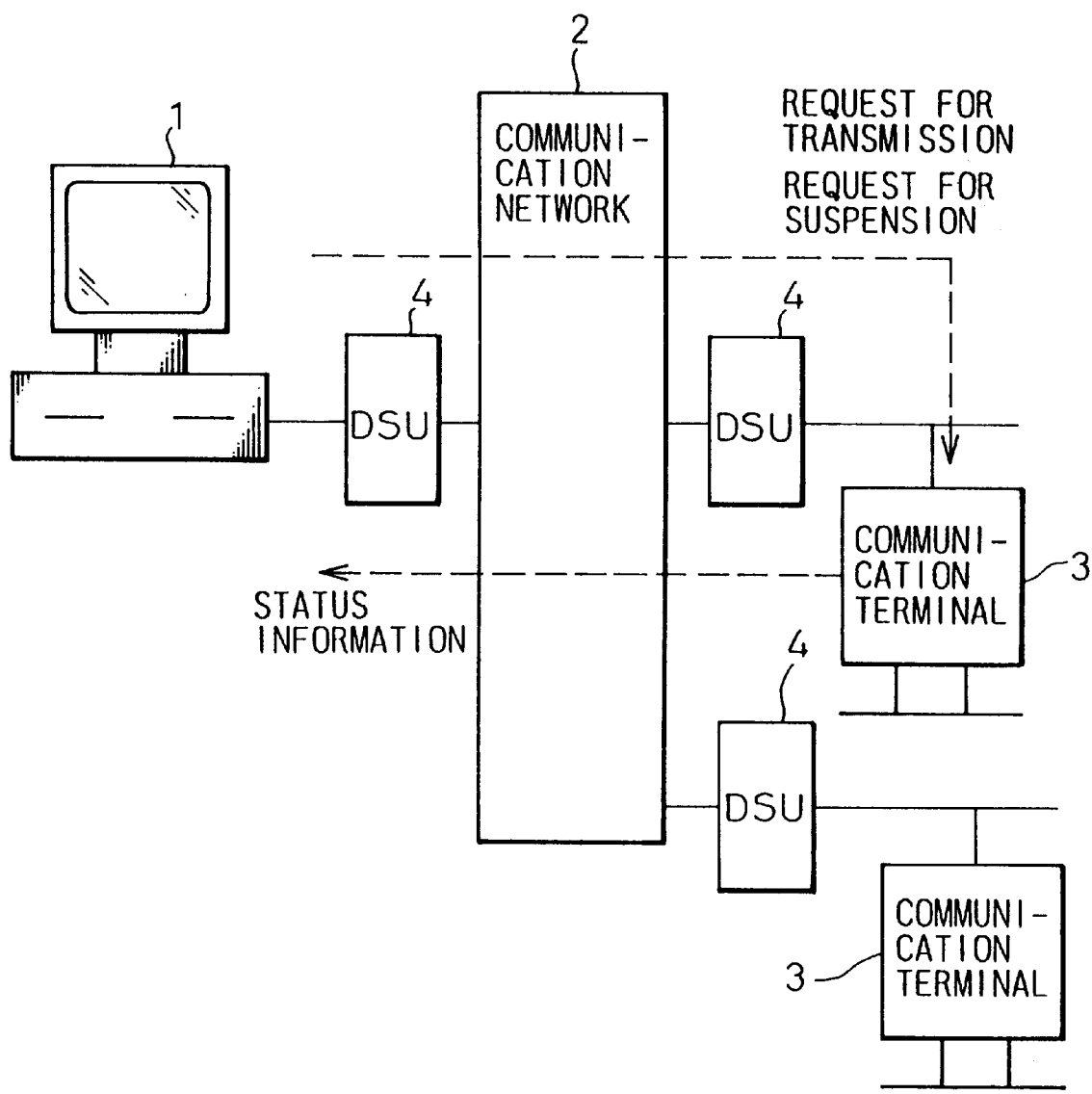

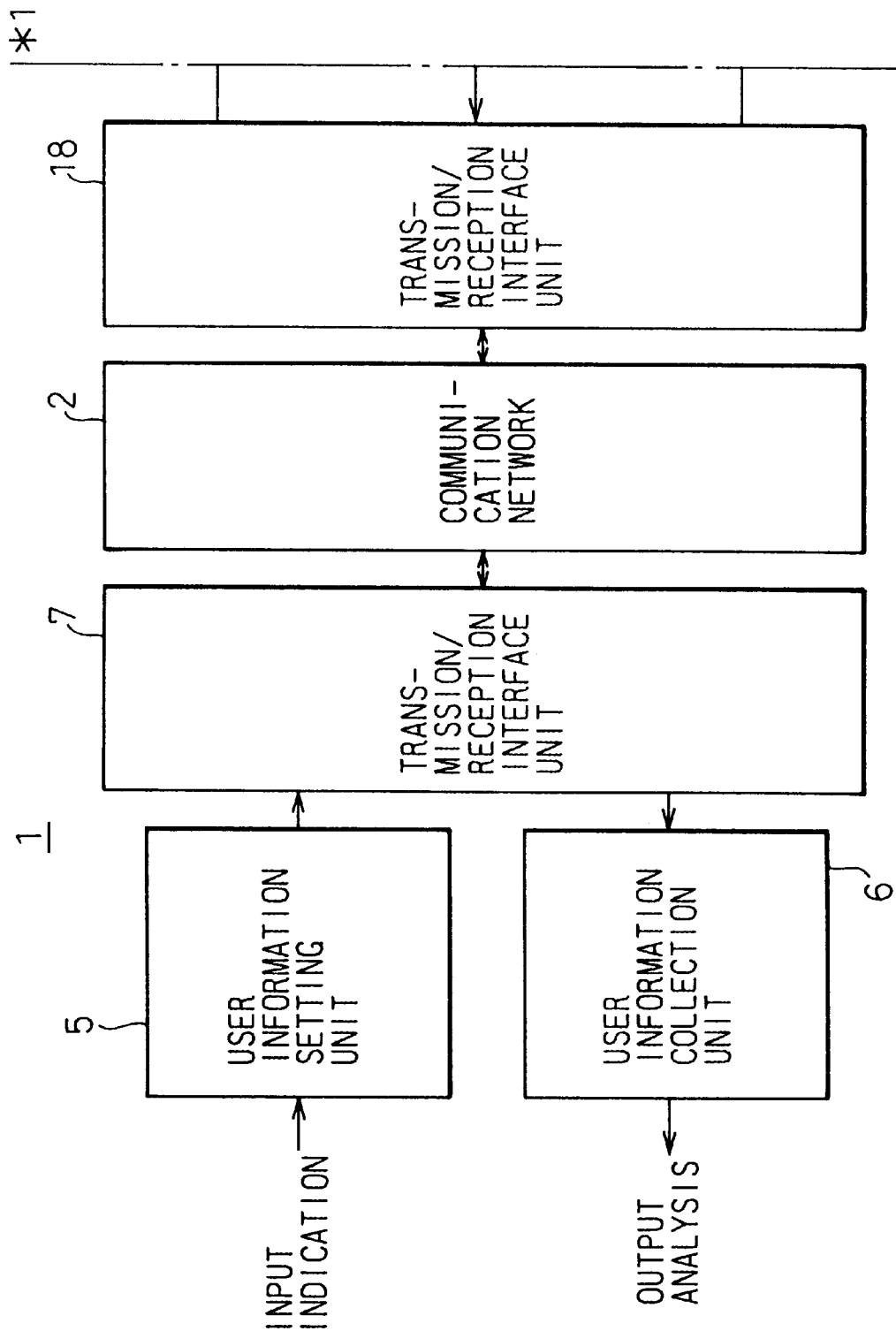

Fig.6

| | | INPUT COMMAND/RESULT CODE |
|---|---|---|
| STARTUP | COMMAND | A T D [REMOTE TELEPHONE NUMBER] < [REMOTE SUBADDRESS] $M-8D0480857FFF CR LF |
| | RESULT CODE | CR LF NO CARRIER CR LF<br>CR LF 0D0A93 CR LF |
| SUSPEN-SION | COMMAND | A T D [REMOTE TELEPHONE NUMBER] < [REMOTE SUBADDRESS] $M-8D0480867FFF CR LF |
| | RESULT CODE | CR LF NO CARRIER CR LF<br>CR LF 0D0A93 CR LF |
| REPORT S INFOR-MATION BUSY | COMMAND | |
| | RESULT CODE | CR LF NO CARRIER CR LF<br>CR LF 0D0A93 808702FF02010007959152100000000 REMOTE ADDRESS=9591521<br>S INFORMATION ALL ALARMS CAUSE=#17 |
| REPORT P INFOR-MATION BUSY | COMMAND | |
| | RESULT CODE | CR LF NO CARRIER CR LF<br>CR LF 0D0A93 808701FF01110795915210000000 DIAGNOSIS REMOTE ADDRESS=9591521<br>P INFORMATION ALL ALARMS DISCONNECTION INFORMATION=#01 INFORMATION=00 |
| REPORT LOWER LAYER L1 DEACT | COMMAND | |
| | RESULT CODE | CR LF NO CARRIER CR LF<br>CR LF 0D0A93 808704FF05140108010100000000<br>LOWER ALL L1 DEACT<br>LAYER ALARMS |

Fig.7B

TYPE 1 FORMAT

```
7 6 5 4 3 2 1 0
```
1:ON/0:OFF

BIT 0: S INFORMATION
    1: P INFORMATION
    2: LOWER LAYER
    3: MODEM LINE

TYPE 2 FORMAT

```
7 6 5 4 3 2 1 0
```
1:ON/0:OFF

BIT 0: ABNORMAL DISCONNECTION
    1: BUSY DISCONNECTION
    2: NORMAL DISCONNECTION

*2

COMMUNICATION SYSTEM INCLUDING MANAGEMENT TERMINAL AND PLURALITY OF COMMUNICATION TERMINALS AND ENABLING QUICK MAINTENANCE AND MANAGEMENT

BACKGROUND OF THE INVENTION

1. Field of the Invention

The present invention relates to a communication system including a management terminal and a plurality of communication terminals and enabling quick maintenance and management, in more detail, relates to a method for managing the status of communication terminals by a management terminal and to a management terminal and communication terminals for the same.

In the communication system in which a plurality of communication terminals such as telephone terminals, data terminals, facsimile terminals, and other communication terminals are accommodated in communication network and communicate for each other, the number of communication terminals has been increased steadily and therefore results in increasingly larger system size. As a result, a need has arisen for a means for facilitating the management of the terminals in the large sized communication system.

2. Description of the Related Art

As will be explained in detail later referring to the drawings, the management terminal manages to operate the communication system stably, by collecting the status information of the communication terminals such as data terminals, telephone terminals, facsimile terminals, and other communication terminals, by judging whether or not the different parts are operating normally, and by instructing maintenance personnel etc. to repair parts where abnormalities have occurred.

In such a communication system, conventionally, when the management terminal requests status information from communication terminals, the management terminal has to request the status information by specifying the desired communication terminals. In a large sized communication system, however, there is a problem that it is not easy to specify the most suitable communication terminals. Further, a communication terminal, even if a failure occurs, cannot send out status information unless it receives a request from the management terminal. Accordingly, the collection of information by the management terminal becomes slow and there is a problem of a long time required for the maintenance and management.

Further, in a large sized system, a plurality of management terminals sometimes are distributed at different locations. In this case, status information can only be transmitted to a particular management terminal and therefore there is a problem of a lack of flexibility. Further, the status information is transmitted by occupying a speech path, so there is a problem that the communication terminals cannot communicate during this period.

Further, the status information transmitted from a communication terminal includes all of the status information held in that terminal, which means that the management terminal must process an enormous amount of information. That is, various types of information are included other than the information most required for the troubleshooting, so there is the problem that the time required for analysis of the information in the management terminal becomes long. Further, the communication terminals are not provided with means for confirming whether or not the status information transmitted to the management terminal has actually reached it, so there is a problem that it is impossible to guarantee that all of the desired status information was able to be collected when a management terminal manages the communication terminals.

SUMMARY OF THE INVENTION

Therefore, an object of the present invention is to enable a management terminal to manage communication terminals without occupying a speech path and by collecting only the desired type of the status information.

To attain the above object, the present invention provides a communication system including a management terminal connected to a communication network via network termination unit etc. and a plurality of communication terminals, wherein user-user information in a call setup message from the management terminal is used to indicate the type of the status information and to request its transmission or request its suspension to the communication terminals. A communication terminal receiving a transmission request extracts address information identifying the management terminal contained in the call setup message and holds the same. When an occurrence of a failure or other specific phenomenon is detected, it sends the indicated type of status information to the management terminal by the user-user information in the call setup message using the address information indicating the management terminal as the termination address information.

Due to this, it becomes possible to collect only the desired type of the status information and thereby perform maintenance and management quickly.

BRIEF DESCRIPTION OF THE DRAWINGS

The above object and features of the present invention will be more apparent from the following description of the preferred embodiments with reference to the accompanying drawings, wherein:

FIG. 1 is an explanatory view of the principle of the present invention;

FIGS. 2A and 2B are explanatory views of an embodiment of the present invention;

FIG. 6 is an explanatory view of the commands and codes of an embodiment of the present invention;

FIGS. 7A and 7B are explanatory views of the user-user information of an embodiment of the present invention;

DESCRIPTION OF THE PREFERRED EMBODIMENTS

Before describing the embodiments of the present invention, the related art and the disadvantages therein will be described with reference to the related figures.

Figure 14:
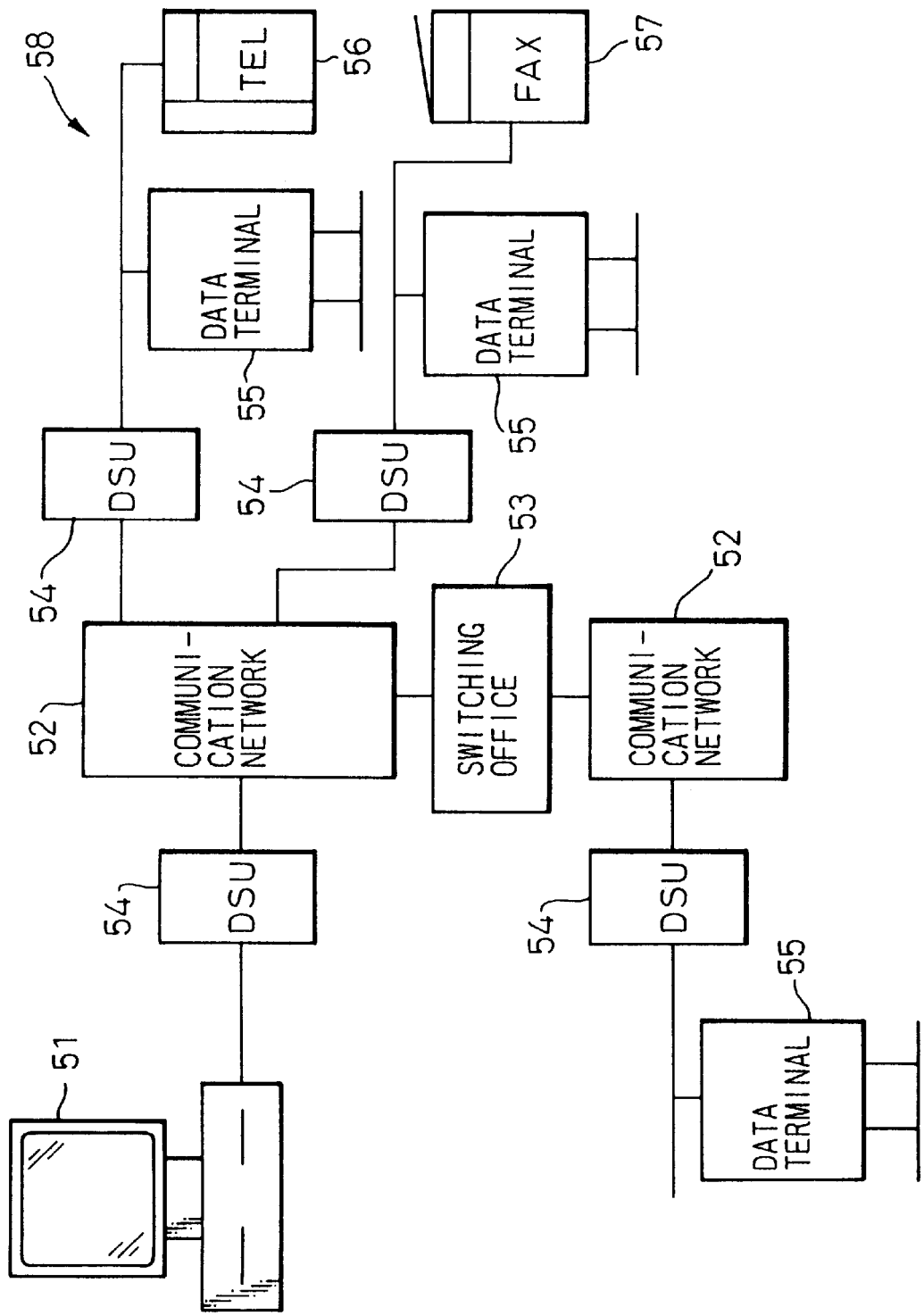
FIG. 14 is an explanatory view of a communication system.

FIG. 14 is an explanatory view of a communication system in which 51 denotes a management terminal, 52 a communication network, 53 a switching office, 54 a network termination unit such as a digital service unit (DSU), 55 a data terminal, 56 a telephone terminal (TEL), and 57 a facsimile terminal (FAX). Where the communication network 52 is comprised by an ISDN, if communication terminals such as the data terminal 55, telephone terminal 56, facsimile terminal 57, etc. are not ISDN terminals, they are connected via terminal adapters having modem functions.

The management terminal 51 collects the status information regarding the communication terminals such as data terminal 55, telephone terminal 56, facsimile terminal 57, and other communication terminals, decides whether or not the different parts are operating normally, instructs maintenance personnel etc. to repair any parts in which abnormality occurred, and thereby enables the management of the communication system to operate stably.

Figure 15:
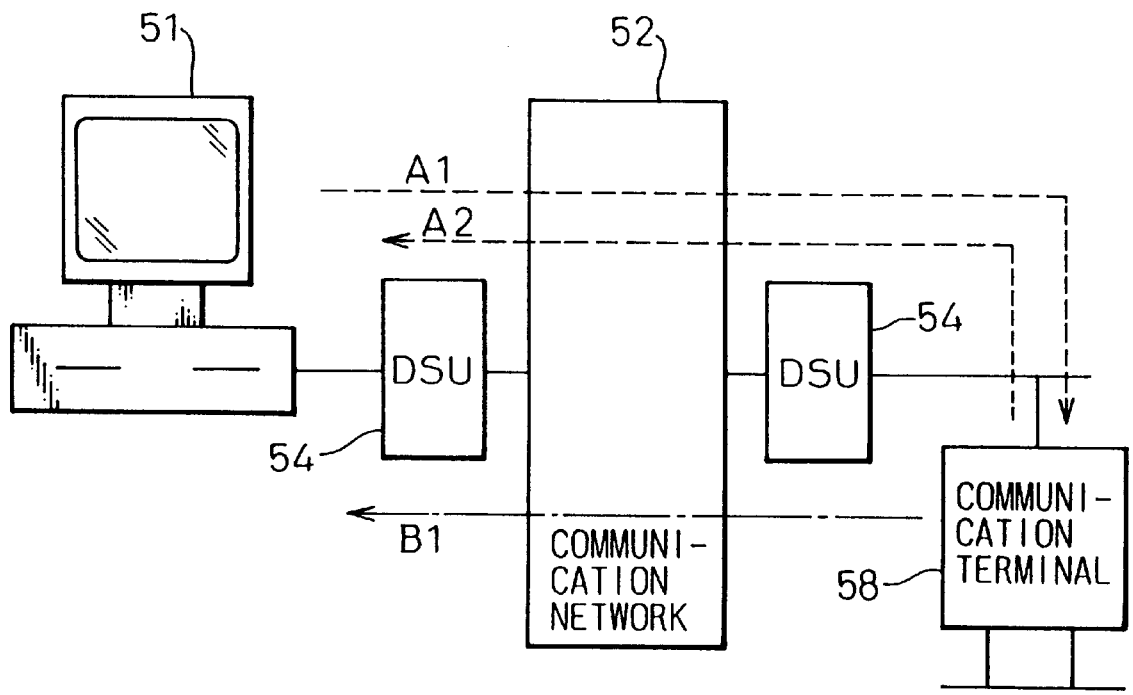
FIG. 15 is an explanatory view of the terminal management method of a conventional example.

FIG. 15 is an explanatory view of a method of management of communication terminals in the related art. In this example, a request A1 for status information is transmitted from the management terminal 51 to a communication terminal 58 such as a data terminal via the communication network 52 as indicated by the broken arrow. Due to this, the communication terminal 58 transmits the status information A2 held in it to the management terminal 51 as indicated by the broken arrow. This management terminal 51 decides whether or not the communication terminal 58 and the channel thereof are operating normally based on the collected status information A2 and thereby monitors the status of the communication terminal 58.

In this case, the status information request A1 is transmitted as for example user-user information in the call setup message from the management terminal 51. Further the communication terminal 58 can transmit the status information A2 as user-user information in the response message sent in response to the call setup message.

In this method of management of communication terminals, it is the management terminal 51 which requests and collects the status information from the communication terminals 58, but the communication terminals 58 supervise their own operations as well, and when one detects a failure or other specific phenomenon, it will originate a call to the management terminal 51, and a speech path will be formed via the communication network 52, then the communication terminal 58 will transmit status information B1 as indicated by the dot-dash line via the speech path. The management terminal 51 manages the status of the communication terminals 58 by collecting this status information B1 as well.

When the management terminal 51 requests status information from the communication terminals 58 in the related art, the management terminal 51 has to request the status information while specifying the desired communication terminals 58. In a large sized communication system, therefore, there is the problem that it is not easy to specify the most suitable communication terminals 58. Further, a communication terminal 58, even if a failure occurred in its, cannot transmit status information unless there is a request from the management terminal 51. Accordingly, there is a problem that collection of information by the management terminal 51 becomes slow and the time required for the maintenance and management becomes long.

Further by having the communication terminals 58 supervise their own internal operations and, when detecting a failure or other specific phenomenon, if the communication terminal 58 originates a call to the management terminal 51 to send the status information, it is possible to quickly send status information indicating the occurrence of the failure to the management terminal 51, but originating a call to the management terminal 51 requires the accurate setting of the number of the management terminal 51. If there is an error in the set number, the occurrence of the failure cannot be notified to the management terminal 51.

Further, in a large sized communication system sometimes a plurality of management terminals 51 are distributed at different locations. In this case, status information can only be transmitted to a particular management terminal 51 and therefore there is a problem of a lack of flexibility. Further, the status information is transmitted by occupying a speech path, so there is a problem that the communication terminals 58 cannot communicate during this period.

Further, the status information transmitted from a communication terminal 58 includes all of the status information held in that terminal, which means that the management terminal 51 must process an enormous amount of information. That is, various types of information are included other than the information most required for the troubleshooting, so there is the problem that the time required for analysis of the information in the management terminal 51 becomes long. Further, the communication terminals 58 are not provided with means for confirming whether or not the status information transmitted to the management terminal 51 has actually reached it, so there is a problem that it is impossible to guarantee that all of the desired status information was able to be collected when a management terminal 51 manages the communication terminals 58.

The present invention enables a management terminal to manage the communication terminals without occupying a speech path and by collecting only the desired type of status information.

The method of managing communication terminals according to the present invention will now be explained by referring to FIG. 1.

According to a first aspect of the present invention, there is provided a method of management of communication terminals 3 accommodated in a communication network 2 wherein status information of the communication terminals 3 is collected and managed by a management terminal 1, wherein the management terminal 1 uses the information for users at the time of setting up a call to the communication terminals 3 to request the transmission of the status information autonomously or the suspension of the transmission of the same autonomously, the communication terminals 3 transmit their status information to the management terminal 1 using the information for users at the time of response during a call setup or at the time of a call autonomously setup in response to a request for transmission of status information, and the management terminal 1 includes a function of extracting and collecting the status information from the information for users from the communication terminals 3 at the time of a response or at the time of a call setup via the communication network 2.

That is, the management terminal 1 instructs a designated communication terminal 3 to transmit status information according to need or, after instructing transmission, instructs the above communication terminal 3 to stop the transmission when the status information becomes unnecessary. Further, the communication terminal 3 requested to transmit status information will autonomously originate a call to the management terminal 1 and transmit the status information when detecting a failure or other specific phenomenon. The instruction for transmission of the status information from the management terminal 1 or the instruction for suspension of transmission, and the transmission of the status information from the communication terminals 3 can be carried out by using the information for users at the time of a call setup, for example, the user-user information in the call setup message. Accordingly, predetermined status information can be transmitted without the use of speech paths at the time of detection of an occurrence of a failure or other specific phenomenon.

According to a second aspect of the present invention, the communication terminal 3 can include a function of extracting and holding address information indicating the management terminal 1 at the time of receiving a request for transmission of the status information from the management terminal 1 and of transmitting the status information of the communication terminal 3 by the information for users at the time of a call autonomously setup using this address information.

That is, the communication terminal 3 extracts and holds the origination address added to the call setup message or the origination address added to the packet for requesting a call when receiving an instruction for transmission of the status information from the management terminal 1. Accordingly, the call setup message or the packet for requesting a call can be transmitted to the management terminal 1 requesting the transmission of the status information using this address information.

According to a third aspect of the present invention, the management terminal 1, using the user-user information in the call setup message or the call user information in the packet for requesting the call to the communication terminal 3, specifies the type of status information which should be transmitted and instructs that the terminal 3 should autonomously transmit the status information or stop the transmission of the same, while the communication terminal 3, using the user-user information in a call setup message or call user information in the packet for requesting a call autonomously transmitted at the time of detection of a specific phenomenon in response to the request for transmission of the status information from the management terminal 1, transmits the specified type of the status information.

That is, the management terminal 1 transmits the call setup message or packet for requesting a call to a specified communication terminal 3. At this time, the terminal 1 using the user-user information or the call user information, specifies the type of the status information and requests the transmission or the suspension of transmission. The communication terminal 3 autonomously transmits a call setup message or packet for requesting a call to the management terminal 1 when detecting an occurrence of a failure or other specific phenomenon after receiving a request for transmission of status information. At this time, the terminal 3 transmits the specified type of the status information using the user-user information or the call user information. Accordingly, the management terminal 1 can collect the preliminarily specified type of status information at the time when detecting an occurrence of a failure or other specific phenomenon at the communication terminal 3.

According to a fourth aspect of the present invention, the communication terminal 3, when detecting a specific phenomenon, uses the user-user information in the call setup message or the call user information in the packet for requesting a call to autonomously transmit status information to the management terminal 1 and, when detecting an abnormal state where this status information does not normally reach the management terminal 1, analyzes the cause behind this abnormal state, and thus performs processing for retransmission based on the result of this analysis.

That is, when transmitting status information using the user-user information in the call setup message or the call user information in the packet for requesting a call, if abnormal termination occurs due to a disconnection message etc., the communication terminal 3 analyzes the cause behind the disconnection and, if the disconnection is due to the line being busy etc., performs processing for retransmission since a retry is possible.

According to a fifth aspect of the present invention, the management terminal 1 is provided with a user information setting unit which specifies the type of status information which should be collected and requests transmission of the status information or the suspension of transmission of the same via the communication network 2 to the communication terminal 3 by using the information for users at the time of call setup and with a user information collection unit which extracts the information for users at the time of a response or at the time of a call setup, received from the communication terminal 3 via the communication network 2, and collects the status information contained in this information for users.

That is, the user information setting unit of the management terminal 1 specifies the type of the status information to the communication terminal 3 via the communication network 2 by using the information for users, such as the user-user information or the call user information at the time of a call setup, and, at the same time, requests the transmission or the suspension of transmission. Further, the user information collection unit extracts the information for users such as the user-user information or call user information received from the communication terminal 3 via the communication network 2 and collects the status information contained in that information.

According to a sixth aspect of the present invention, the communication terminal 3 is provided with an information analyzing unit which extracts the information for users at the time of a call setup from the management terminal 1 and identifies the type of status information and request for transmission or suspension of transmission, a status supervising and holding unit which supervises the state of the different parts and collects and holds the status information, and a status information transmitting unit which adds to the information for users at the call setup the status information according to the type of the status information held in the status supervising and holding unit at the time of detection of a specific phenomenon and analyzed by the information analyzing unit, and transmits the thus added information.

That is, the information analyzing unit of the communication terminal 3 extracts and analyzes the information for users such as the user-user information or the call user information at the call setup from the management terminal 1 and identifies the type of the status information and a request for transmission or suspension of transmission. Further, the status supervising and holding unit supervises the status of the different parts, detects an occurrence of a failure and other specific phenomenon, and temporarily holds the status information at that detection. Further, the status information transmitting unit selects the status information according to the specified type, reads the same from the status supervising and holding unit at the time of detection of an occurrence of a failure or other specific phenomenon, and transmits the status information by using the information for users such as the user-user information or call user information at the call setup.

According to a seventh aspect of the present invention, the communication terminal 3 can be provided with an abnormality cause analyzing unit for analyzing the cause behind a detected abnormal state when detecting the abnormal state where the status information transmitted by the communication terminal 3 from the status information transmitting unit is not normally received at the management terminal 1 and with a retransmission processing unit for performing processing for retransmitting the status information from the status information transmitting unit based on the result of analysis of the cause of the abnormal termination in this abnormality cause analyzing unit.

That is, when the status information is transmitted from the status information transmitting unit, the abnormality cause analyzing unit of the communication terminal 3 analyzes the information indicating inability of reception at the management terminal 1 or inability of acceptance in the communication network 2 and determines the cause of the abnormality. Further, the retransmission processing unit performs processing for retransmission when the result of analysis of the cause of abnormality in the abnormality cause analyzing unit is a busy line etc. since retransmission is possible.

According to an eighth aspect of the present invention, the communication terminal 3 can be provided with a priority selection unit which selects status information of a priority from status information concerning the contents of failures when the simultaneous occurrence of several types of failures has been detected and causes the selected status information to be transmitted from the status information transmitting unit to the management terminal 1.

That is, the priority selection unit of the communication terminal 3 selects the status information of the highest priority from the status information concerning contents of failures when the failures have simultaneously occurred and causes the status information having the highest priority to be transmitted from the status information transmitting unit.

FIG. 1 is an explanatory view of the principle of the present invention. The communication system is comprised of a plurality of communication terminals 3 connected to a communication network 2 via network termination units (DSU) 4 and a management terminal 1 connected to the communication network 2 via a network termination unit 4. The management terminal 1 specifies the communication terminal 3 from which it wishes to collect the status information and, when the communication network 2 is an ISDN, indicates the type of the status information and transmission of the same by the user-user information in the call setup message. The telephone number of the management terminal 1 is added to this call setup message as the origination address information. When the communication network 2 is a packet switching network, it indicates the type of the status information and transmission of the same by the call user information in the packet for requesting a call. In this case, the telephone number of the management terminal 1 is transmitted while accompanying to the call user information etc. in the packet for requesting a call as the origination address information.

The communication terminal 3 identifies the type of the status information and the instruction of transmission of the same by the user-user information or call user information, that is, the information for users in the call setup message or call origination request message. The terminal 3 extracts and holds the origination address information and transmits the indicated status information to the management terminal 1 by the user-user information or call user information based on this origination address information at the time of detection of an occurrence of a failure or other specific phenomenon as the call setup message or the packet for requesting a call. The broken arrows between the management terminal 1 and the communication terminal 3 indicate the instruction for transmission of the status information and the transmission of status information by the call setup message or the packet for requesting a call etc.

Where it is no longer necessary to collect the status information, the management terminal 1 can transmit a call setup message or a packet for requesting a call to the communication terminal 3 which the management terminal 1 had instructed to transmit the status information and uses the user-user information or the call user information in the call setup message or the packet for requesting a call so as to instruct the suspension of transmission of the status information. Namely, as indicated by the broken arrow, the management terminal 1 requests transmission of the status information or instructs suspension of transmission of the same using the information for users, that is, as indicated by the another broken arrow, the communication terminal 3 receiving the request for transmission transmits the status information to the management terminal 1 using the information for users when detecting an occurrence of a failure or other specific phenomenon.

Figure 2B:
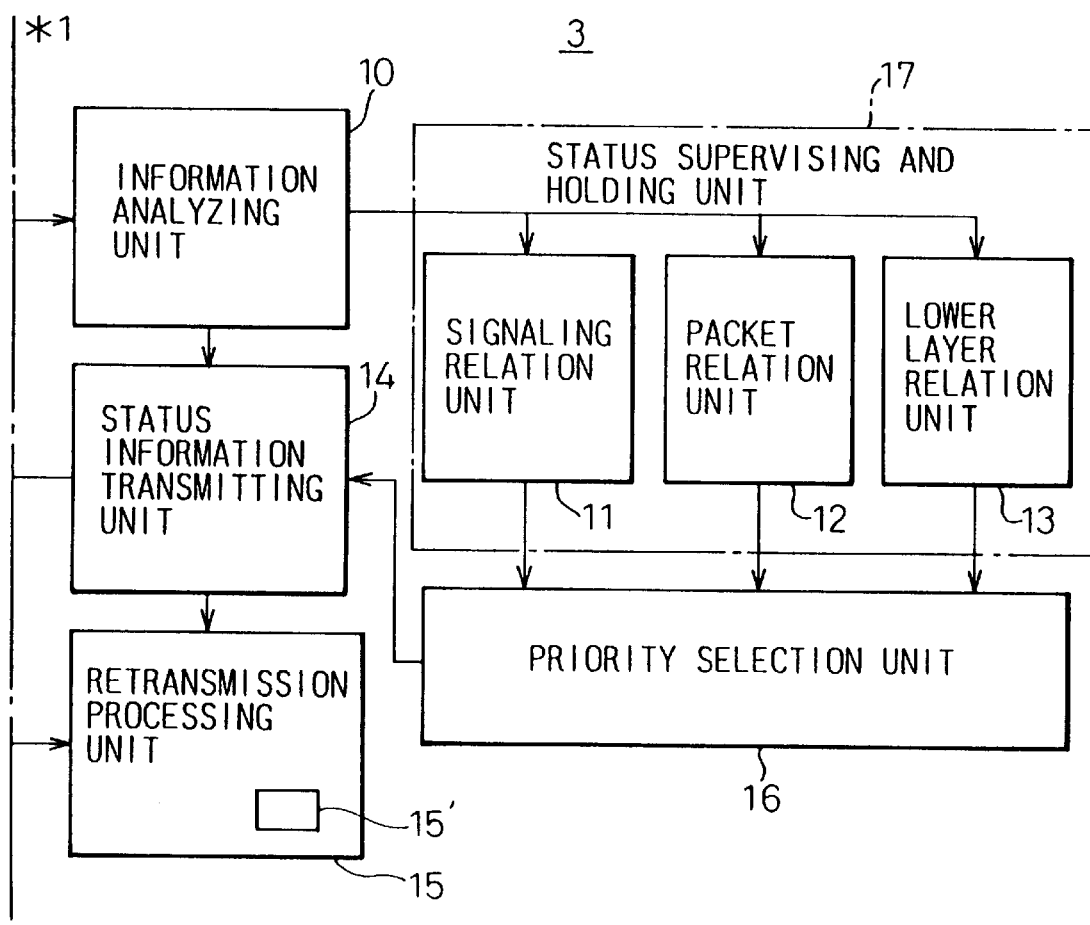

FIGS. 2A and 2B are views explaining an embodiment of the present invention. As shown in the figure, the management terminal 1 includes a user information setting unit 5, a user information collection unit 6, and a transmission and reception interface unit 7. It further includes input/output devices such as a display, printer, keyboard, etc., illustration of which is omitted. The communication network 2 may be an integrated service digital network (ISDN) or packet switching network. The explanation will be made below of the case of an ISDN.

The communication terminal 3 includes an information analyzing unit 10; a status supervising and holding unit 17 including a signaling relation unit 11, a packet relation unit 12, and a lower layer relation unit 13; a status information transmitting unit 14; a retransmission processing unit 15; a priority selection unit 16; and a transmission/reception interface unit 18. It further includes a display, printer, keyboard, telephone set, etc., illustration of which is omitted.

The management terminal 1 designates the communication terminal 3 from which the status information is to be collected and indicates the type of status information to be collected to this communication terminal 3. For this, by the above input indication, the user information setting unit 5 sets the instruction of the type of the status information and the instruction for transmission of the same in the user-user information and instructs the transmission of the call setup message to the transmission/reception interface unit 7. The transmission/reception interface unit 7 forms the call setup message including termination address information indicating the communication terminal 3 and the origination address information indicating the management terminal 1, adds the user-user information indicating the instruction of the type of the status information and the instruction of transmission, and transmits the same.

The signaling relation unit 11 of the status supervising and holding unit 17 in the communication terminal 3 supervises the state of call control in relation to the channel switching and, when detecting an occurrence of a failure, sends the supervising information to the priority selection unit 16 and holds the status information. The packet relation unit 12 supervises the state of call control in relation to the packet switching and, when detecting an occurrence of a failure, notifies the failure to the priority selection unit 16 and holds the status information. The lower layer relation unit 13 supervises the electrical and physical states and the state of the data link and, when detecting an occurrence of a failure, notifies the failure to the priority selection unit 16 and hold the status information thereof.

When receiving a call setup message from the management terminal 1 via the transmission/reception interface unit 18, the information analyzing unit 10 extracts and analyzes the user-user information, and thereby the unit 10 identifies the instruction for transmission of the status information. Then the unit 10 identifies the instruction of the type of the status information, notifies the same to the status supervising and holding unit 17, extracts the origination address information contained in the call setup message, and holds the same.

Further, when notified that an occurrence of a failure or other specific phenomenon has been detected in the status supervising and holding unit 17, the priority selection unit 16 activates the status information transmitting unit 14 and transfers the necessary status information and address information of the management terminal 1 to the status information transmitting unit 14. For example, where the management terminal 1 indicates the status information, as the type of status information, on the state supervised by the signaling relation unit 11, the priority selection unit 16 activates the status information transmitting unit 14 and makes it send the status information only when the signaling relation unit 11 detects the occurrence of a failure in the call control in relation to the channel switching. That is, control is possible so that status information of types which are not instructed is not sent.

When the types of status information for two or all of the signaling relation unit 11, packet relation unit 12, and the lower layer relation unit 13 is instructed and the occurrences of several failures are simultaneously detected, the priority selection unit 16 selects the type of the status information of the highest priority for transmission. For example, it gives priority to the detection of a failure by the lower relation unit 13 and transmits the status information of that failure. Further, when continuously detecting the same type of failure, control is performed so as to first transmit the first detected status information.

The retransmission processing unit 15 includes an abnormality cause analyzing unit 15'. When status information is given from the status information transmitting unit 14, and if status information cannot normally reach the management terminal 1 due to a busy state at the management terminal 1 or congestion at the communication network 2, the retransmission processing unit 15 transfers a notification of the inability of reception by the user-user information from the management terminal 1 and disconnection cause information contained in the disconnection message from the communication network 2 from the information analyzing unit 10 or the transmission/reception interface unit 18 to the abnormality cause analyzing unit 15' in the retransmission processing unit 15 and analyzes the same in this abnormality cause analyzing unit. If retransmission is possible, the retransmission processing unit 15 activates the status information transmitting unit 14 again and makes it transmit the status information to the management terminal 1 again.

Figure 3A:
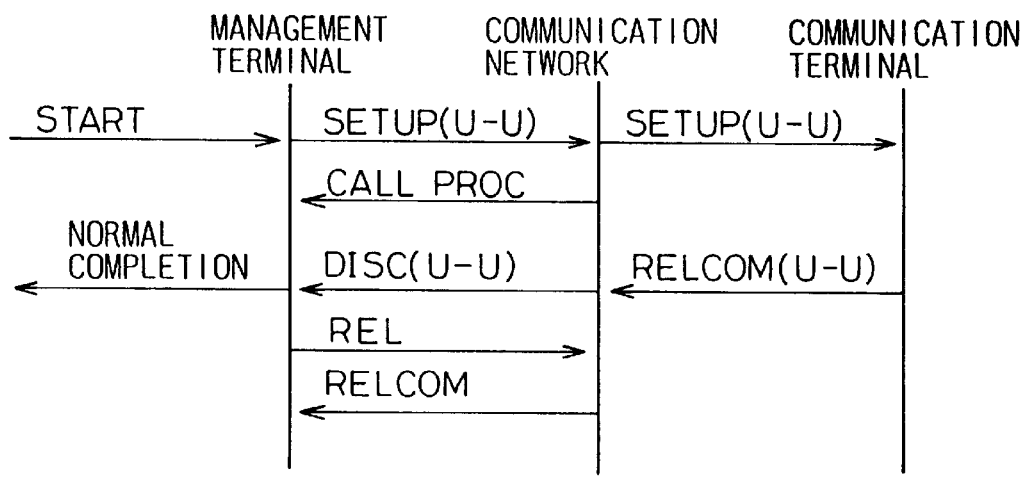
FIGS. 3A and 3B are explanatory views of sequences of an embodiment of the present invention.
Figure 3B:
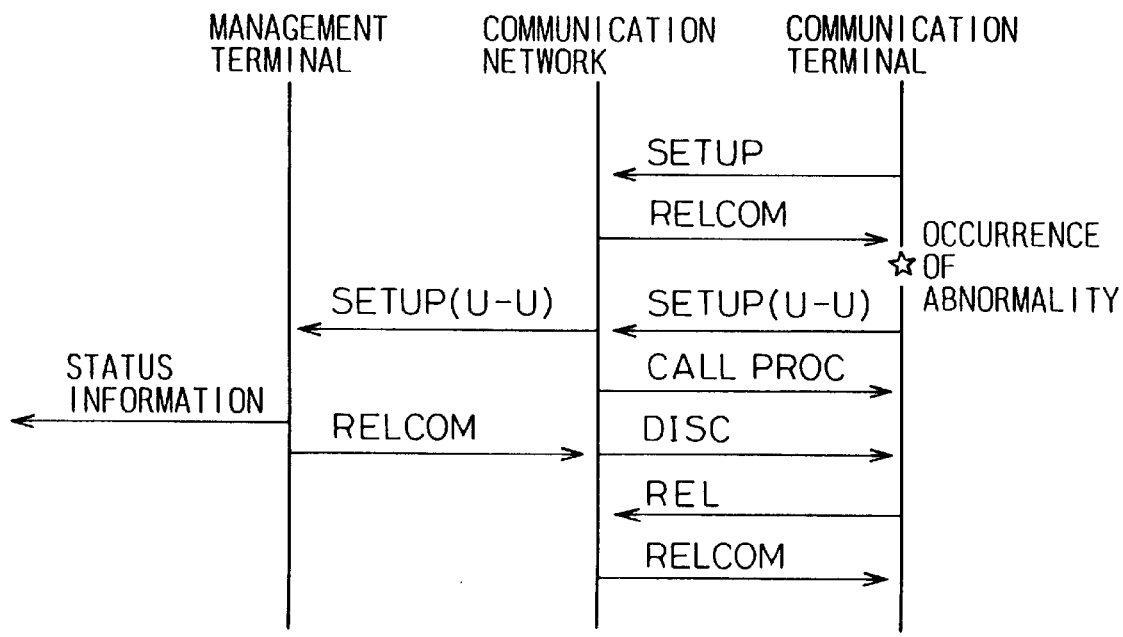

FIGS. 3A and 3B are explanatory views of sequences of an embodiment of the present invention, in which FIG. 3A shows a startup sequence; and FIG. 3B shows a sequence for transmission of status information. In the startup sequence of FIG. 3A, when the management terminal 1 specifies a communication terminal 3 and it starts by instructing the transmission of status information and instructing the type of status information, the user information setting unit 5 and the transmission/reception interface unit 7 transmit a call setup message SETUP (U-U) to the communication network 2. The communication network 2 transmits the call setup acceptance message CALL PROC to the management terminal 1 in response to this call setup message and sends a call setup message SETUP (U-U) to the communication terminal 3 identified by the termination address information. Note that, U-U indicates the user-user information which contains the instruction for transmission of status information and instruction of the type of status information as mentioned before.

The communication terminal 3 receives the call setup message SETUP (U-U) from the management terminal 1 via the communication network 2, transfers that call setup message SETUP (U-U) to the information analyzing unit 10 via the transmission/reception interface unit 18, extracts and analyzes the user-user information U-U in the information analyzing unit 10, and, when identifying the instruction for transmission of the status information and instruction of the type of the status information from the management terminal 1, extracts the origination address information indicating the management terminal 1 and holds the same and controls the status supervising and holding unit 17 according to the instruction of the type of the status information. Then, it transmits a release completion message RELCOM (U-U) to the management terminal 1 from the transmission/reception interface unit 18 to the communication network 2 using the origination address information.

The communication network 2 transmits a disconnection message DISC (U-U) to the management terminal 1. The management terminal 1 identifies the disconnection message from the communication terminal 3, judges that the startup has been normally completed, and transmits the release message REL. The communication network 2 transmits a release completion message RELCOM in response to this. In this case, it is also possible to insert and transmit the status information concerning the type indicated by the management terminal 1 into the user-user information U-U in the release completion message RELCOM (U-U) from the communication terminal 3. The user-user information U-U in this case is transferred as the user-user information in the disconnection message DISC (U-U) from the communication network 2 to the management terminal 1.

The type of status information to be collected can be instructed from the management terminal 1 to a desired communication terminal 3 by the above startup sequence. Further, in this case, it is possible to transmit the status information held at the time of the startup by using the user-user information in the release completion message which is sent in response to the call setup message.

In the sequence for transmission of status information of FIG. 3B, when a specific phenomenon is detected, such as indicated by the "occurrence of abnormality" in the communication terminal 3, the communication terminal 3 transmits a call setup message SETUP (U-U) to the management terminal 1 by the status supervising and holding unit 17, the priority selection unit 16, the status transmitting unit 14, and the transmission/reception interface unit 18. The user-user information U-U in this case, as mentioned before, includes the status information of the type instructed by the management terminal 1.

The communication network 2 transmits this call setup message SETUP (U-U) to the management terminal 1 and, at the same time, transmits a call setup acceptance message CALL PROC to the communication terminal 3. Further, the management terminal 1 transfers the call setup message SETUP (U-U) from the communication network 2 to the user information collection unit 6 via the transmission/ reception interface unit 7, extracts and analyzes the user-user information U-U, and, when identifying that it is status information from the communication terminal 3, applies the result of analysis to a display, alarm equipment, etc. to notify the occurrence of the abnormality to the maintenance personnel.

The management terminal 1 transmits a release completion message RELCOM in response to the received call setup message SETUP (U-U). The communication network 2 transmits a disconnection message DISC to the communication terminal 3 by this release completion message RELCOM, and the communication terminal 3 transmits the release message REL. In response to this, the communication network 2 transmits the release completion message RELCOM.

Accordingly, when a failure occurs while supervising a specified type of status, the status information can be immediately transmitted to the management terminal 1 without setting a speech path in the communication network 2. Also, in this case, all of the status information is not transmitted but only the status information required in the management terminal 1 is transmitted. Therefore, the total amount of status information collected at the management terminal 1 can be minimized, the processing for analysis etc. can be completed in a short time, and thus quick maintenance and management can be achieved.

Figure 4:
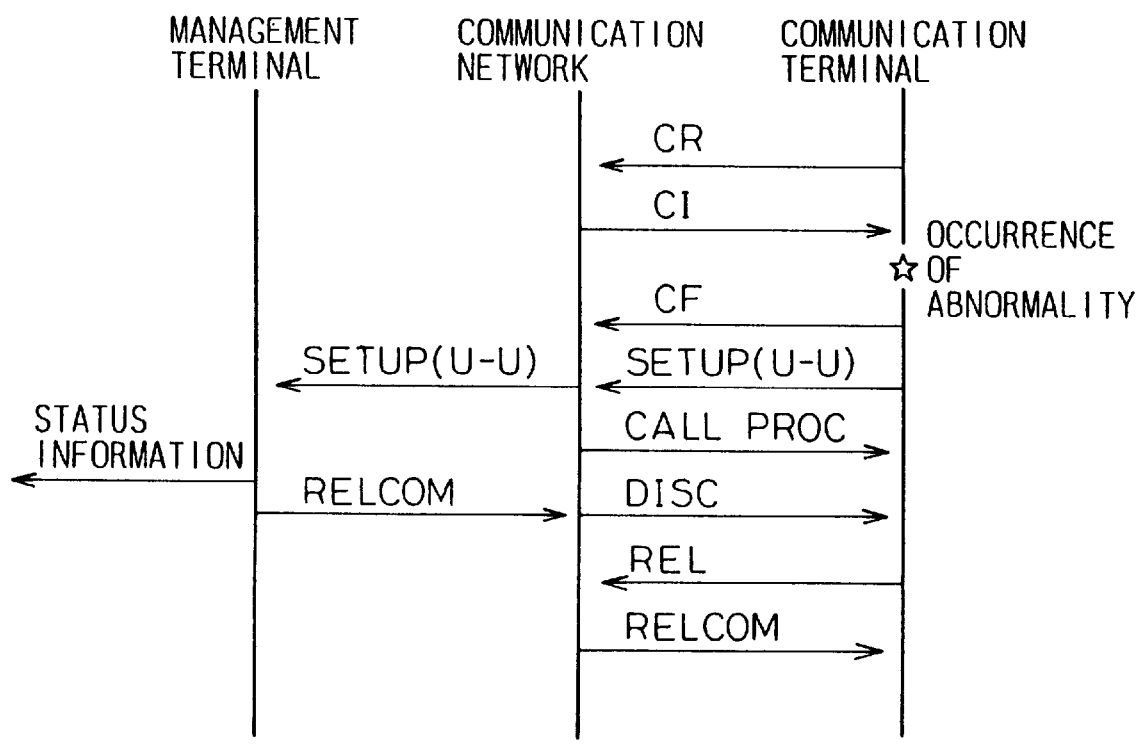
FIG. 4 is an explanatory view of a sequence for dealing with an abnormality in packet information of an embodiment of the present invention.

FIG. 4 is an explanatory view of a sequence for dealing with an abnormality in packet information in an embodiment of the present invention. Assume that an abnormality occurs after a call origination request packet CR (call request) is transmitted from the communication terminal 3 to the communication network 2 and a clear indication packet CI (clear indication) is received from the communication network 2. When this happens, the status information transmitting unit 14 is activated from the priority selection unit 16 in a state where the clear confirmation packet CF (clear confirmation) is transmitted, that is, by detecting an occurrence of a failure or other specific phenomenon in the packet relation unit 12 of FIG. 2B. The status information collected in the packet relation unit 12 is transferred to the status information transmitting unit 14, that status information is set as the user-user information, and the call setup message SETUP (U-U) is transmitted from the transmission/reception interface unit 18 to the management terminal 1.

The communication network 2 transmits this call setup message SETUP (U-U) to the management terminal 1 and transmits the call setup acceptance message CALL PROC to the communication terminal 3. The management terminal 1 extracts and analyzes the user-user information U-U in the call setup message SETUP (U-U), collects the status information from the communication terminal 3, and transmits the release completion message RELCOM to the communication network 2. The communication network 2 transmits the disconnection message DISC to the communication terminal 3, the communication terminal 3 transmits the release message REL to the communication network 2, and the communication network 2 transmits the release completion message RELCOM to the communication terminal 3.

Figure 5A:
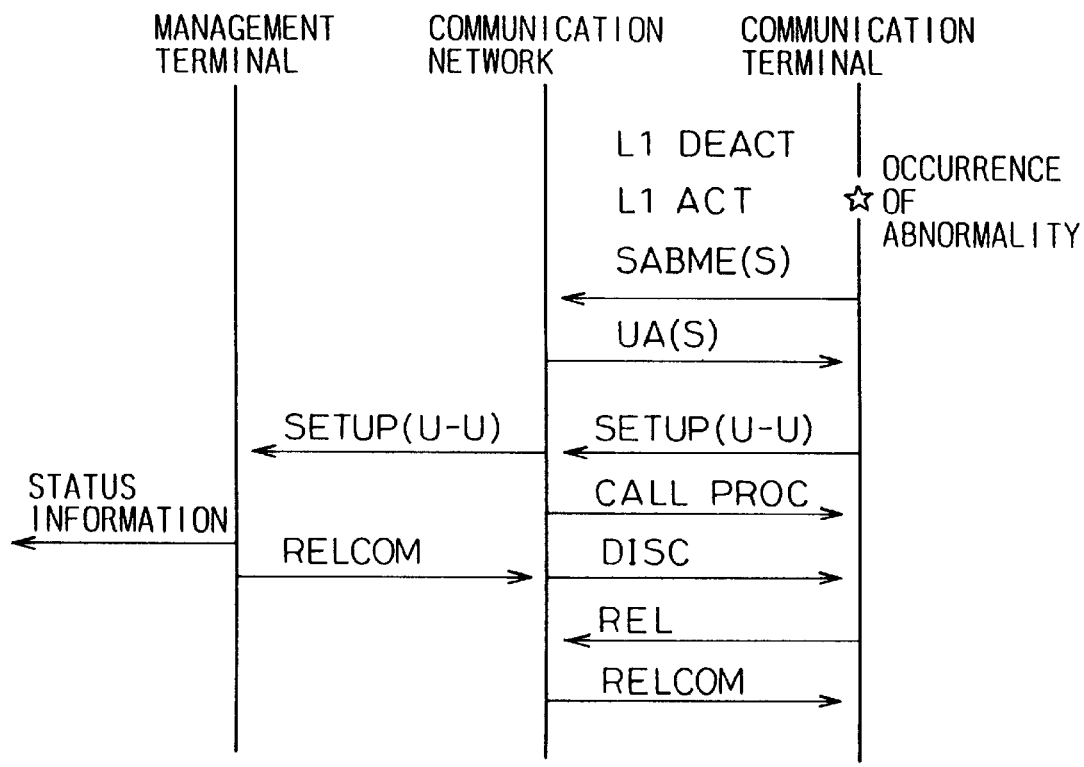
FIGS. 5A and 5B are explanatory views of a sequence for dealing with an abnormality in lower layer information and a sequence for suspension of transmission of an embodiment of the present invention.
Figure 5B:
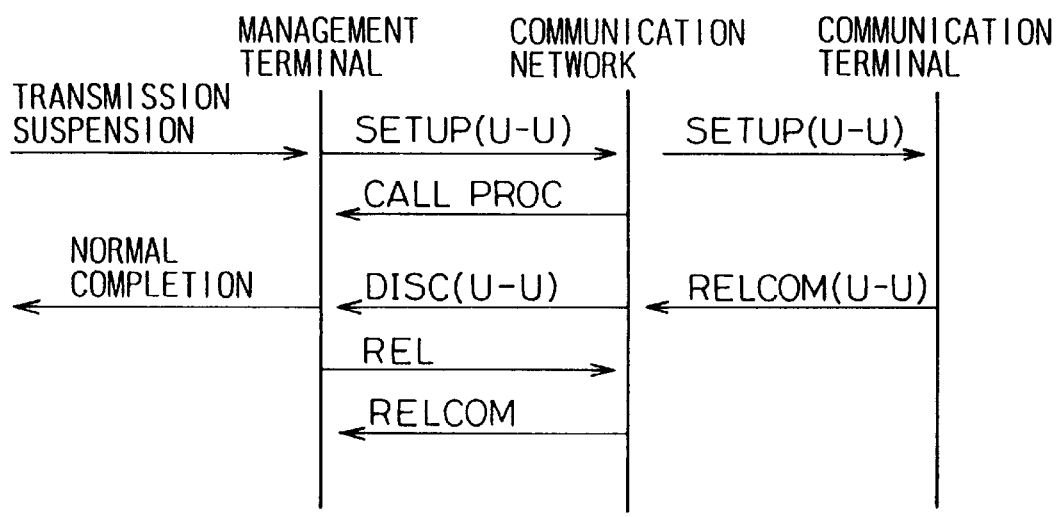

FIGS. 5A and 5B are explanatory views of the sequence for dealing with an abnormality in the lower layer information and a sequence for suspension of transmission of an embodiment of the present invention, respectively. The occurrence of an abnormality is recognized by detection of a loss of synchronization (such as L1 DEACT) on the channel to which the communication terminal 3 is connected. A data link is established by detecting the establishment of synchronization (such as L1 ACT) on the channel after this and then by the transfer of the SABME and UA with the communication network 2.

This loss of synchronization is detected in the lower layer relation unit 13 of FIG. 2B. When the management terminal 1 indicates loss of synchronization as the desired type of status information, the priority selection unit 16 activates the status information transmitting unit 14, the status information collected by the lower layer relation unit 13 is transferred, and the call setup message SETUP (U-U) is transmitted as the user-user information from the transmission/reception interface unit 18.

The communication network 2 transmits this call setup message SETUP (U-U) to the management terminal 1 and, at the same time, transmits the call setup acceptance message CALL PROC to the communication terminal 3. The management terminal 1 extracts and analyzes the user-user information U-U in the call setup message SETUP (U-U), collects the status information of the communication terminal 3, and transmits the release completion message RELCOM to the communication network 2. Due to this, the disconnection message DISC, release message REL, and the release completion message RELCOM are transferred between the communication network 2 and the communication terminal 3.

Further, in the sequence for suspension of transmission of FIG. 5B, when the management terminal 1 specifies a communication terminal 3 and instructs it to suspend transmission, the user information setting unit 5 sets the instruction for suspension of transmission in the user-user information and the transmission/reception interface unit 7 transmits the call setup message SETUP (U-U) containing the information. The communication network 2 transmits this call setup message SETUP (U-U) to the communication terminal 3 and transmits the call setup acceptance message CALL PROC to the management terminal 1.

The communication terminal 3 receives the call setup message SETUP (U-U), extracts and analyzes the user-user information U-U by the information analyzing unit 10, and, when identifying that it is an instruction for suspension of transmission of the status information, transmits the release completion message RELCOM (U-U) and controls the status supervising and holding unit 17 and the status information transmitting unit 14 so as not to transmit the status information from the terminal 3.

The communication network 2 transmits the disconnection message DISC (U-U) to the management terminal 1 by the release completion message RELCOM (U-U) from the communication terminal 3. The management terminal 1 transmits the release message REL when judging normal completion, and the communication network 2 transmits the release completion message RELCOM.

FIG. 6 is an explanatory view of the commands and codes of an embodiment of the present invention. It shows first the code resulting from the command for startup and the code resulting from the command for suspension. The "report S information" shows the code at the time of detection of a specific phenomenon by the signaling relation unit 11 in FIG. 2B, while the "report P information" shows the code at the time of detection of a specific phenomenon by the packet relation unit 12 in FIG. 2B. The "report lower layer" shows the code at the time of detection of a specific phenomenon by the lower layer relation unit 13 in FIG. 2B.

Figure 7A:
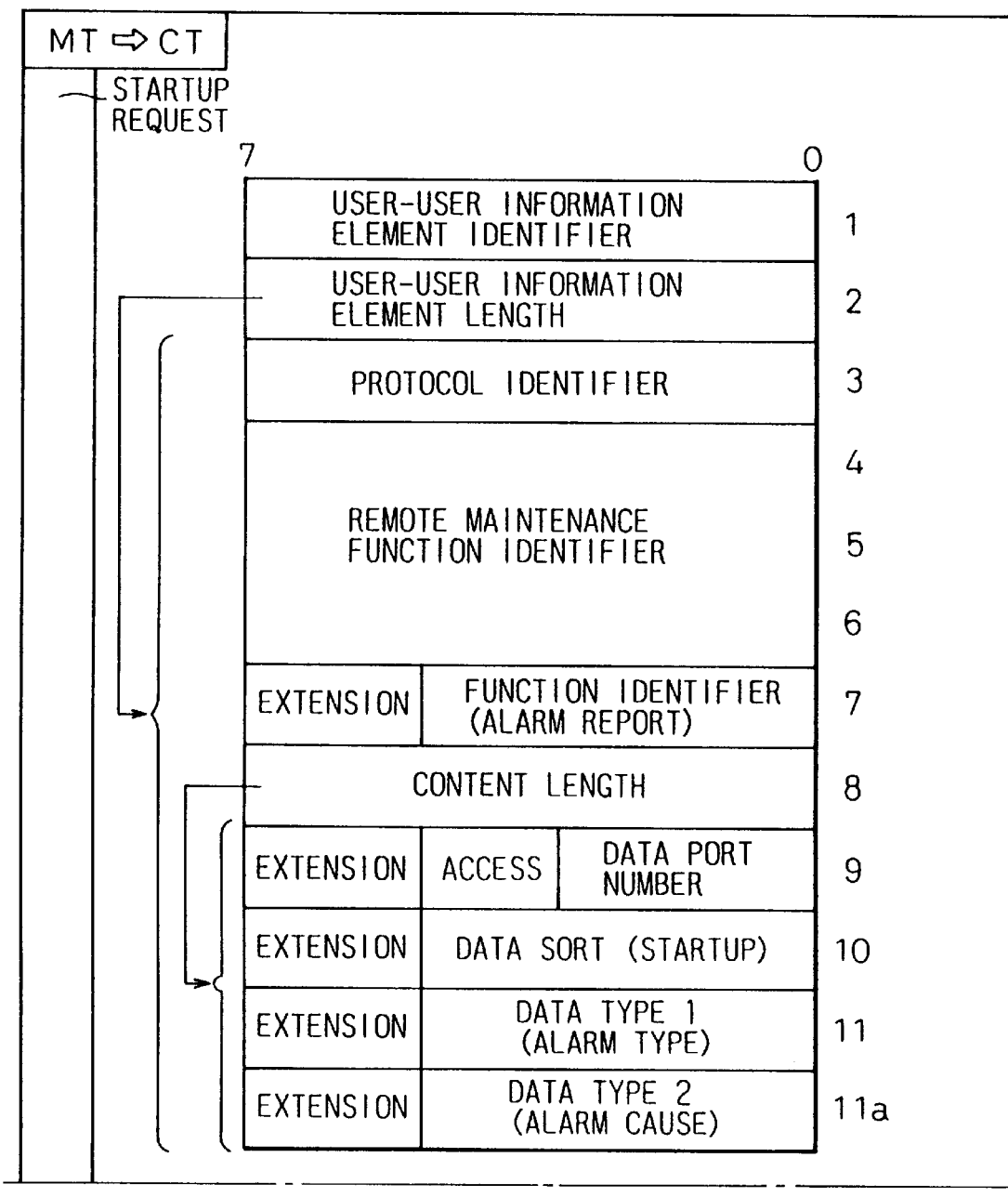

FIGS. 7A and 7B are explanatory views of the user-user information of the embodiment of the present invention. MT denotes a management terminal, and CT a communication terminal. The figure shows a case where the communication terminal CT side is started from the management terminal MT side. The user-user information contains a user-user information element identifier, user-user information element length, protocol identifier, remote maintenance function identifier, function identifier, content length, data port number, data sort, data type 1 (alarm type), data type 2 (alarm cause), etc.

Further, the "S information" of the 0-th bit in the type 1 format shows the status information by the signaling relation unit 11 in FIG. 2B; the "P information" of the 1st bit shows the status information by the packet relation unit 12 in FIG. 2B; the "lower layer" of the 2nd bit shows the status information by the lower layer relation unit 13 in FIG. 2B; and the "modem line" of the 3rd bit shows the status information of the modem line of terminal connected to the communication terminal. Further, the 0-th bit in the type 2 format shows an abnormal disconnection, the 1st bit shows busy disconnection, and the 2nd bit shows a normal disconnection.

The call setup message SETUP (U-U) is transmitted from the management terminal MT to the communication terminal CT, the communication terminal CT is started by the function identifier of the alarm report, the data sort of the startup, the data type 1 of the alarm type, etc. in the user-user information U-U thereof, and the indicated status information is transmitted at the time of detection of an occurrence of a failure or other specific phenomenon.

Figure 8:
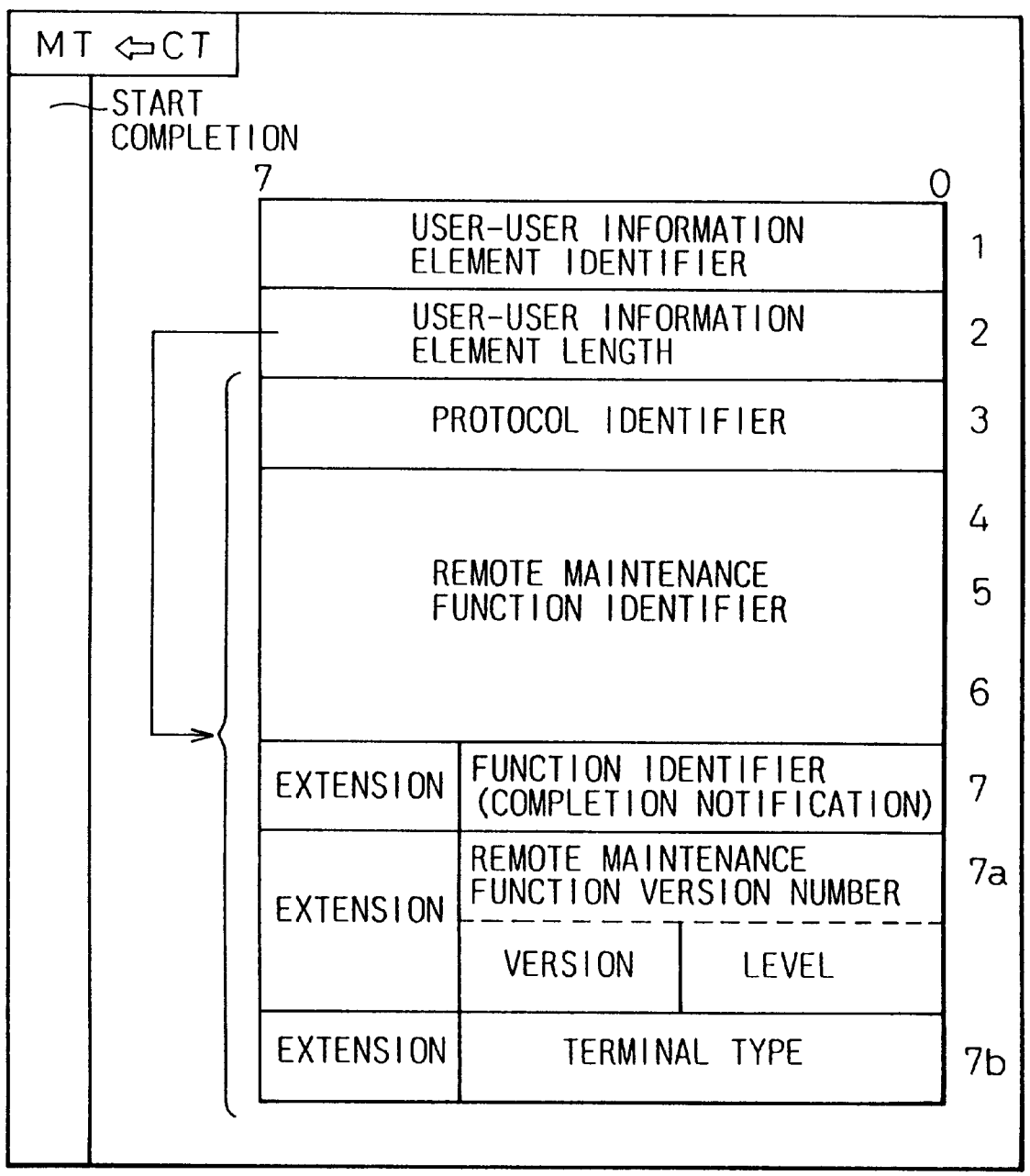
FIG. 8 is another explanatory view of the user-user information of an embodiment of the present invention.

FIG. 8 is another explanatory view of the user-user information of an embodiment of the present invention. The figure shows a case where the communication terminal CT started by a call setup message from the management terminal MT notifies the completion of startup by the user-user information U-U in the release completion message RELCOM (U-U). The user-user information includes a function identifier showing the notification of completion. The management terminal MT can receive and analyze the release completion message RELCOM (U-U) containing the user-user information U-U indicating the completion of startup to confirm the startup of the communication terminal CT.

Figure 9:
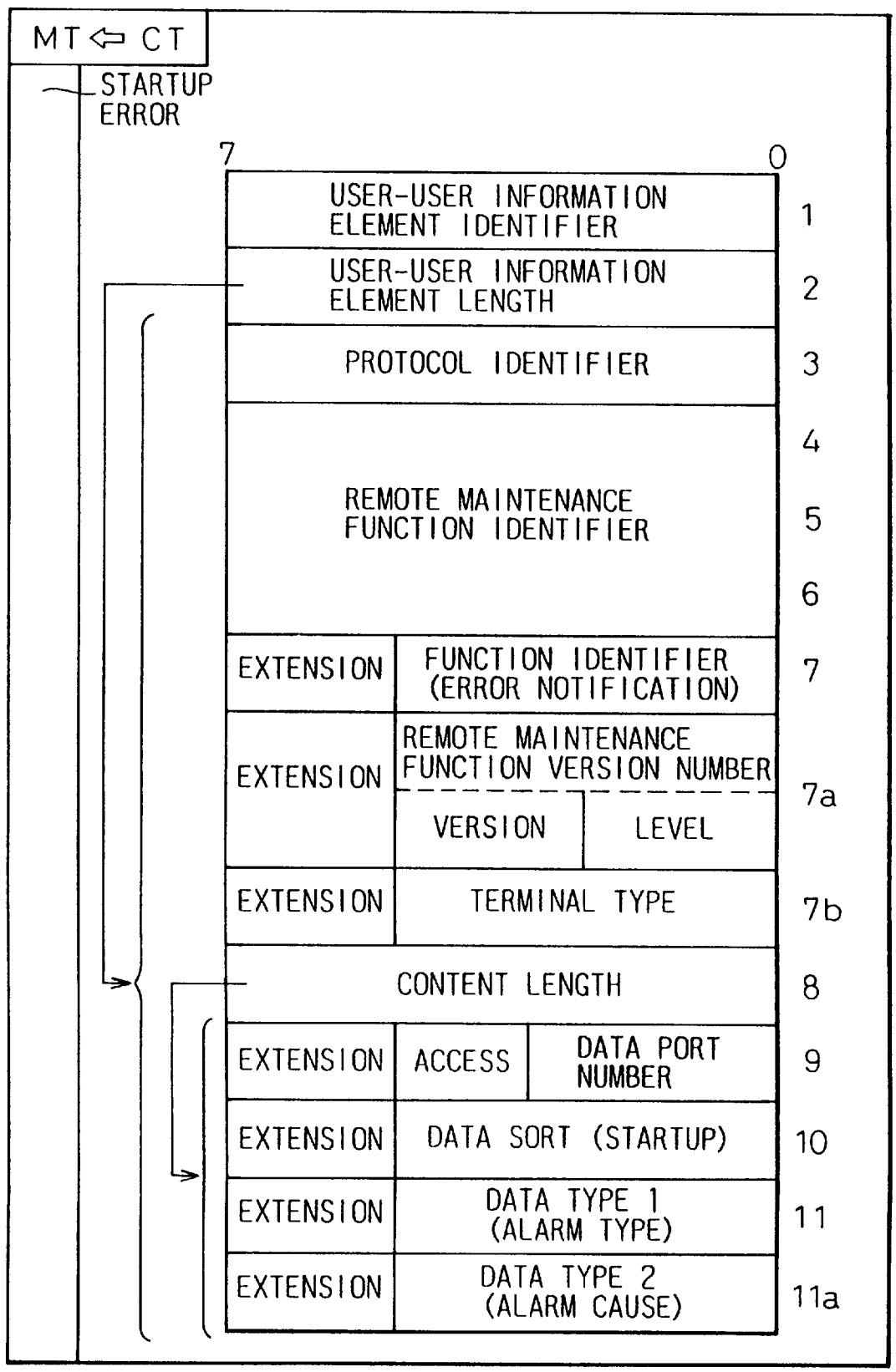
FIG. 9 is another explanatory view of the user-user information of an embodiment of the present invention.

FIG. 9 is another explanatory view of the user-user information of an embodiment of the present invention. The figure shows a case where a startup error occurs in the communication terminal CT started by the call setup message SETUP (U-U) from the management terminal MT and the startup error is notified by the user-user information U-U in the release completion message RELCOM (U-U). The user-user information includes a function identifier for notification of the error. The management terminal MT can for example restart the communication terminal CT in which this startup error occurred.

Figure 10:
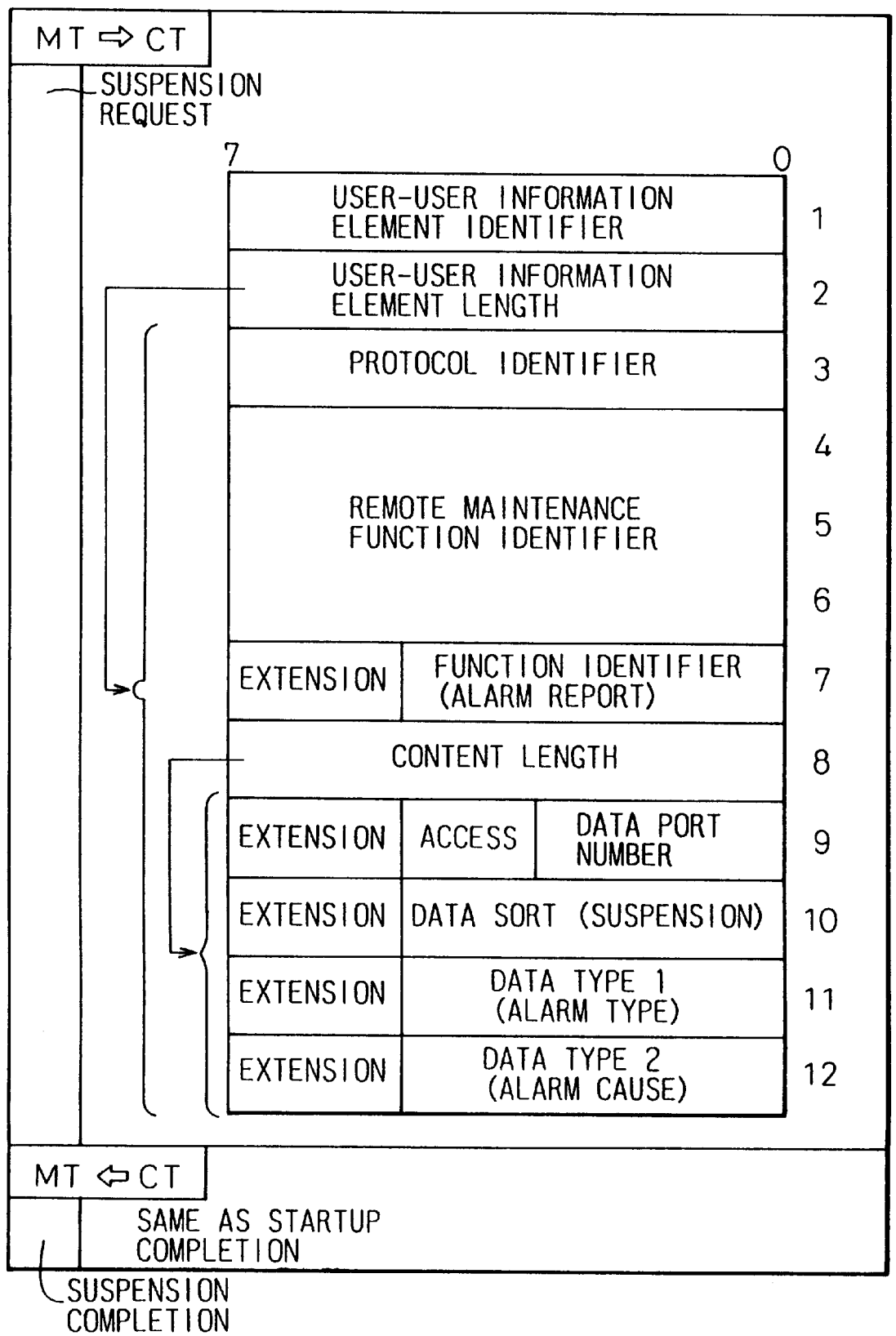
FIG. 10 is another explanatory view of the user-user information of an embodiment of the present invention.

FIG. 10 is another explanatory view of the user-user information of an embodiment of the present invention. The figure shows the case where suspension of transmission of status information is instructed to the communication terminal CT by the call setup message SETUP (U-U) from the management terminal MT. The call setup message SETUP includes the data sort for suspension. The communication terminal CT can receive this call setup message SETUP (U-U), extract and analyze the user-user information U-U, and discriminate that it is an instruction for suspension of transmission of the status information. The completion of suspension is notified from the communication terminal CT to the management terminal MT in response to this request for suspension by the release completion message RELCOM (U-U). The user-user information U-U at this time becomes the same as that of the case of notification of completion of startup of FIG. 8.

Figure 11:
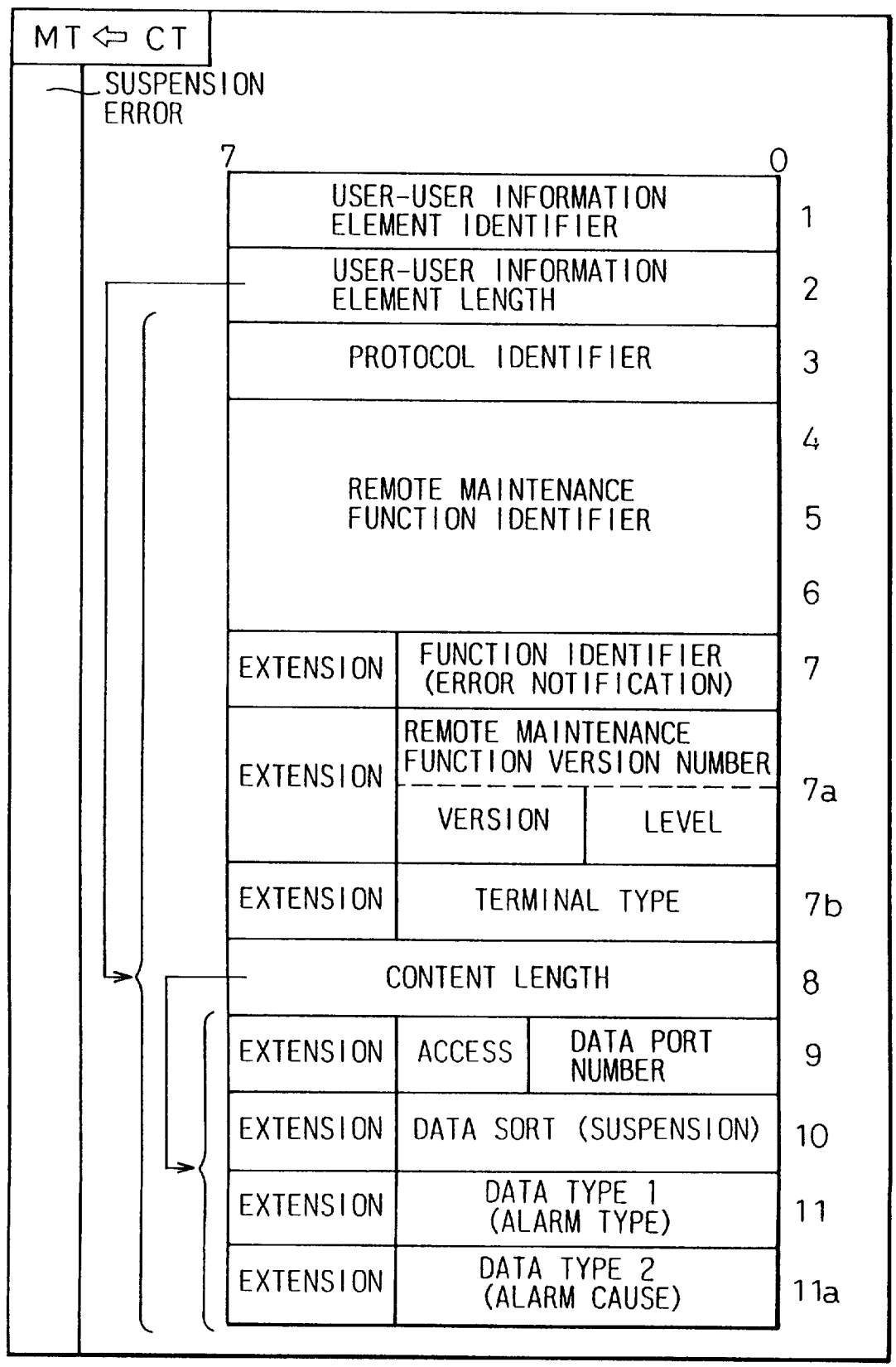
FIG. 11 is another explanatory view of the user-user information of an embodiment of the present invention.

FIG. 11 is another explanatory view of the user-user information of an embodiment of the present invention. The figure shows the user-user information U-U in the release completion message RELCOM (U-U) in a case where suspension of transmission of the status information is instructed from the management terminal MT to the communication terminal CT by the call setup message SETUP (U-U) and a suspension error occurs in the communication terminal CT. This user-user information U-U includes a function identifier for notification of error and the data sort for suspension. The management terminal MT can extract and analyze this user-user information U-U and determine that suspension of transmission of the status information has not been set in the communication terminal CT. In this case, it can make another request for suspension to the communication terminal CT again.

Figure 12A:
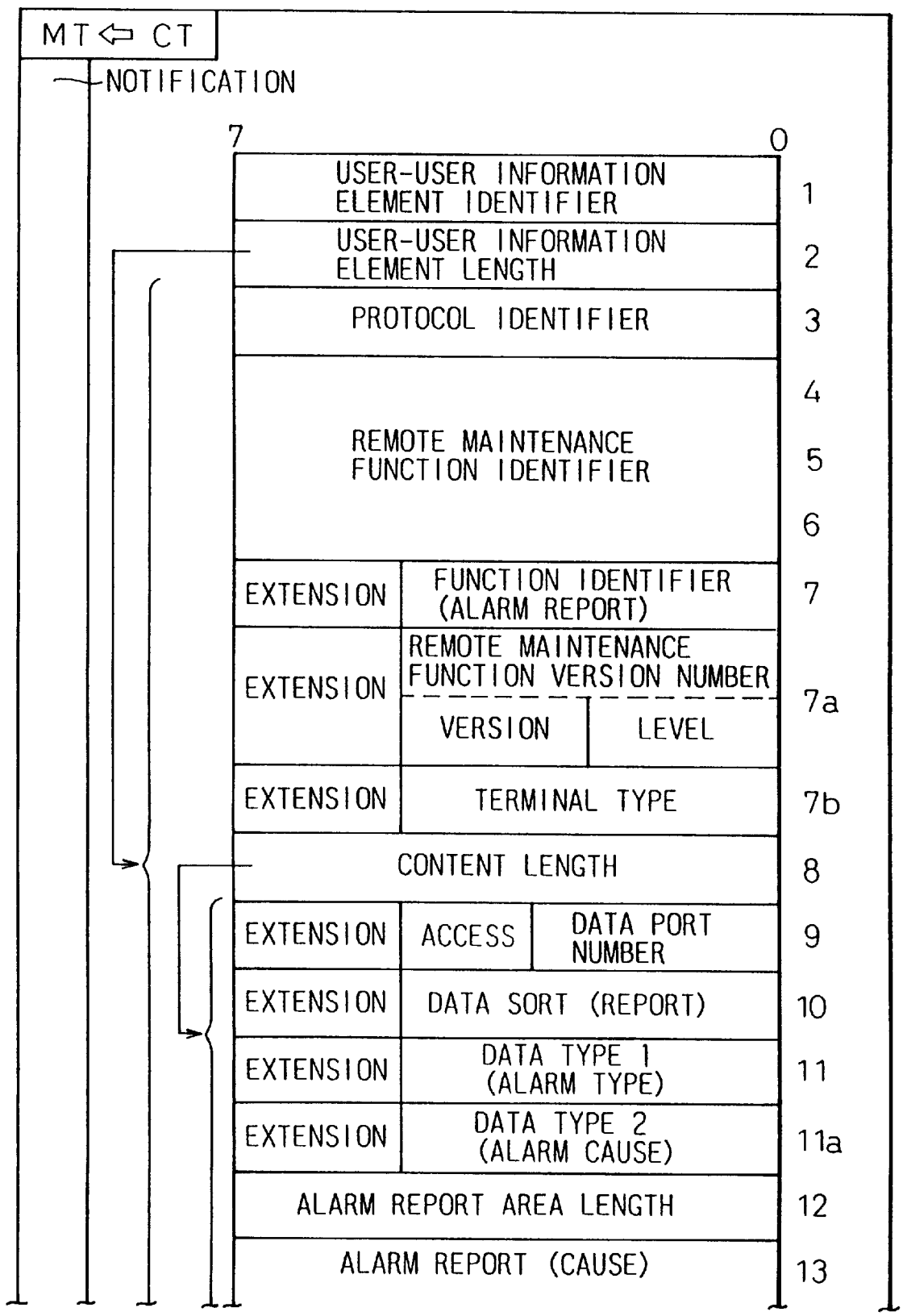
FIGS. 12A and 12B are other explanatory views of the user-user information of an embodiment of the present invention.
Figure 12B:
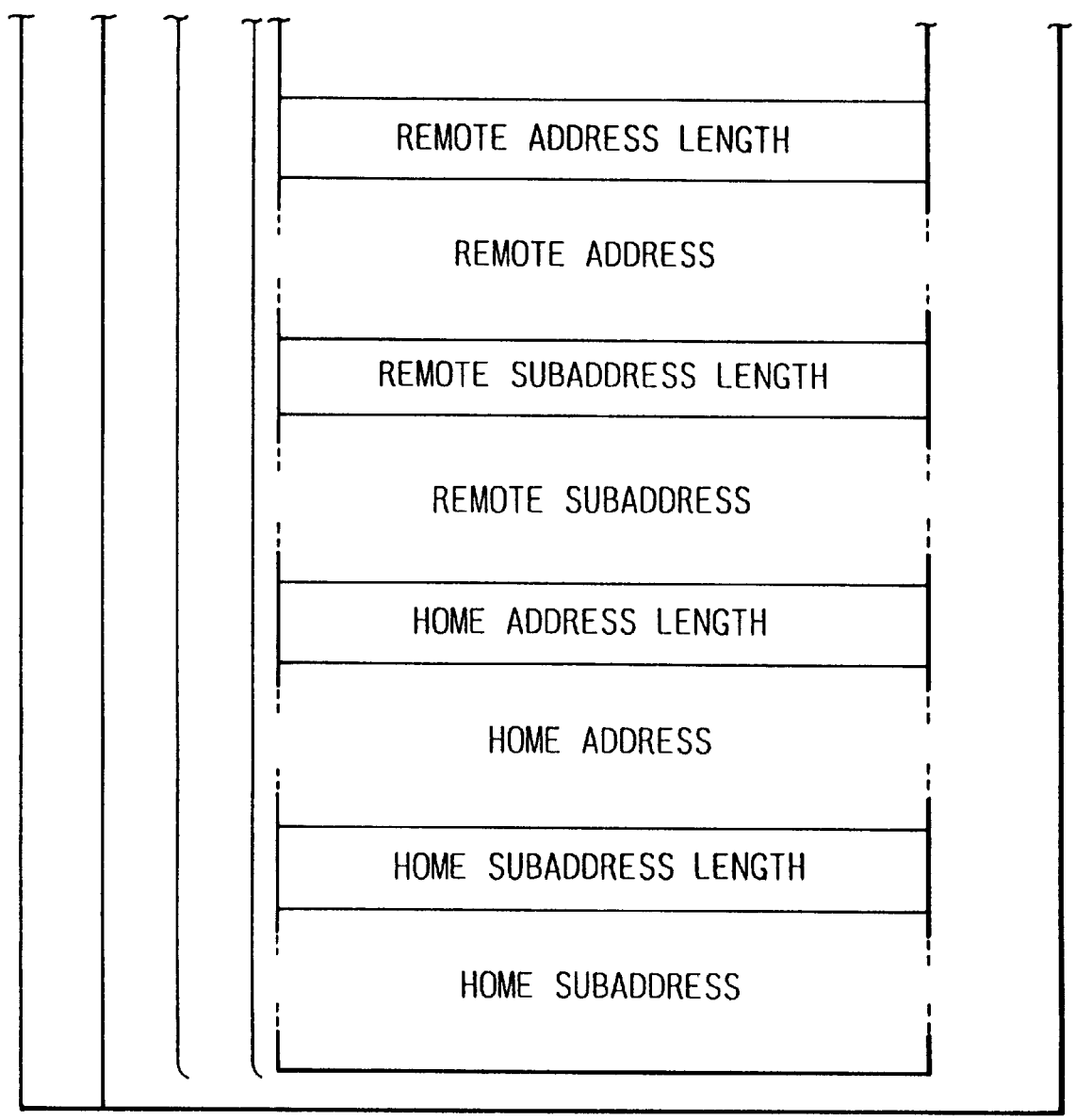

FIGS. 12A and 12B are other explanatory views of the user-user information of an embodiment of the present invention. The figure shows the user-user information in a case where the status information is notified from the communication terminal CT to the management terminal MT. In this case, the status information can be transmitted to the management terminal MT by the user-user information U-U in the call setup message SETUP (U-U) including the function identifier for an alarm report, data sort of report, and indicated type of the status information.

Figure 13:
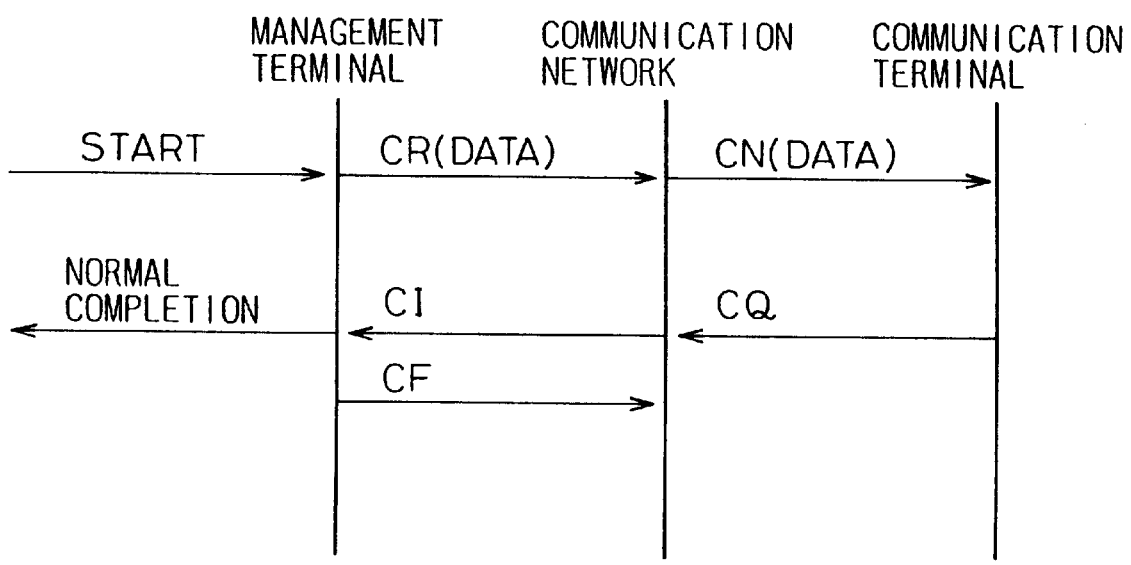
FIG. 13 is an explanatory view of a startup sequence in a packet switching network of an embodiment of the present invention.

FIG. 13 is an explanatory view of the startup sequence in the packet switching network of an embodiment of the present invention. When the management terminal designates and starts up a communication terminal, the management terminal instructs the type of the status information and instructs the transmission of the same by the call user information DATA in the call origination request packet CR as indicated as CR (DATA). The communication network transmits a call termination packet CN containing the call user information DATA to the communication terminal as indicated by CN (DATA) in response to a call origination request packet CR.

The communication terminal receives this call termination packet CN, extracts and analyzes the call user information DATA, and, when identifying that it is a request for startup from the management terminal, transmits a restore request packet CQ. The communication network transmits a clear indication packet CI to the management terminal, and the management terminal transmits a clear confirmation packet CF in response to this. This call user information DATA has a 128 bytes structure similar to the user-user information. Accordingly, it can adopt the same format as that for the user-user information.

When a failure occurs in the communication terminal and the status information is transmitted to the management terminal, transmission of a call origination request packet CR comprising the call user information including the status information from the communication terminal enables the status information to be transmitted to the management terminal without forming a speech path in the communication network.

When the status information transmitted from the communication terminal is not normally received by the management terminal, for example, in the case of the occurrence of a failure or a busy state of the management terminal 1 or in the case where the communication network 2 is congested, analysis of the notification by the user-user information from the management terminal 1 and the disconnection factorial information of the clear indication packet CI from the communication network 2 enables the cause of the abnormal completion to be analyzed. Namely, the cause is analyzed by the abnormality cause analyzing unit included in the retransmission processing unit 15 of FIG. 2B. When retransmission is possible, the status information transmitting unit 14 is activated after a predetermined time interval and the status information is transmitted again to the management terminal 1 by using the user-user information.

As explained above, the method of management of terminals of the present invention has the management terminal 1 side specify the communication terminal 3 and instruct the type of status information and request transmission of the status information or suspension of transmission of the same and has the communication terminals 3 transmit the specified status information when detecting an occurrence of a specified failure or other specific phenomenon. In both cases, use is made of for example the user-user information in the call setup message SETUP for transmission, so there is no need to form a speech path in the communication network 2 and it becomes possible to collect only the status information required by the maintenance personnel on the management terminal 1 side. Thus, the status information to be analyzed becomes the minimum and there is an advantage that quick maintenance and management become possible.

Further, since the management terminal 1 of the present invention can specifies the communication terminals 3 from which the status information is collected and can instruct the type of the status information thereof, even in a large sized communication system, it becomes possible to collect the minimum amount of the status information required. Due to this, quick maintenance and management become possible. Also even when the communication system is large in size and includes several management terminals 1 connected to the communication network 2, the communication terminals 3 can identify the management terminal 1 concerned by referring to for example the origination address information contained in the call setup message SETUP, so there is an advantage that the status information can be transmitted to the management terminal 1 requesting the transmission without confusion of status information.

Further, since the communication terminals 3 of the present invention transmit the status information only when started up by the management terminal 1 and detecting an occurrence of a specified failure or other specific phenomenon, they can quickly transmit the status information by the user-user information in the call setup message SETUP etc. without forming a speech path in the communication network 2.

Further, when the status information transmitted from a communication terminal 3 is not normally received at the management terminal 1, the abnormality cause analyzing unit included in the retransmission processing unit 15 in FIG. 2B can analyze the cause of the abnormality and, when the cause is that the management terminal 1 is busy etc., can activate the status information transmitting unit 14 after a predetermined time to perform processing for retransmission. Accordingly, there is an advantage that the status information can be reliably transmitted to the management terminal 1 when a failure of the type indicated from the management terminal 1 occurs.

We claim:

1. A method of management of terminals in a communication system wherein status information of the communication terminals accommodated in a communication network is collected and managed by a management terminal, said status information being a signal indicative of a condition of each communication terminal, wherein the management terminal uses the information for users, which is a user-use information signal, at the time of setting up a call to the communication terminals to request the transmission of the status information autonomously or the suspension of the transmission of the same autonomously, each of the communication terminals sends its own status information to the management terminal, which status information is placed on the information for user to be transmitted thereto, at the time of response during a call setup or at the time of a call autonomously setup in response to a request for transmission of status information, and the management terminal includes a function of extracting and collecting the status information from the information for users from the communication terminals at the time of a response or at the time of a call set up via the communication network.

2. A method of management of terminals as set forth in claim 1, wherein each of said communication terminals includes a function of extracting and holding address information indicating the management terminal at the time of receiving a request for transmission of the status information from the management terminal and of transmitting the status information of the communication terminal by the information for users at the time of a call autonomously setup using this address information.

3. A method of management of terminals as set forth in claim 2, wherein the communication terminal, when detecting a specific phenomenon, uses the user-user information in the call setup message or the call user information in the packet for requesting a call to autonomously transmit status information to the management terminal and, when detecting an abnormal state where this status information does not normally reach the management terminal, analyzes the cause behind this abnormal state, and performs processing for retransmission based on the result of this analysis.

4. A method of management of terminals as set forth in claim 1, wherein the management terminal uses user-user information in the call setup message or a call user information in the packet for requesting the call to the communication terminal to specify the type of status information which should be transmitted and request the transmission of the status information autonomously or the suspension of the transmission of the same autonomously, while the communication terminal uses a user-user information in a call setup message or the call user information in the packet for requesting a call autonomously transmitted when detecting a specific phenomenon, in response to the request for transmission of the status information from the management terminal so as to transmit the specified type of the status information.

5. A method of management of terminals as set forth in claim 3, wherein the communication terminal, when detecting a specific phenomenon, uses the user-user information in the call setup message or the call user information in the packet for requesting a call to autonomously transmit status information to the management terminal and, when detecting an abnormal state where this status information does not normally reach the management terminal, analyzes the cause behind this abnormal state, and performs processing for retransmission based on the result of this analysis.

6. A management terminal for managing the status of a plurality of communication terminals accommodated in a communication network, which management terminal is provided with a user information setting unit which specifies the type of status information which should be collected, said status information being a signal indicative of a condition of each of said communication terminals, and requests the transmission of the status information or the suspension of the transmission of the same via the communication network to the communication terminal by its autonomous operation and also by using user information which can freely be used by users, without relying upon a communication network configuration, at the time of call setup, and a user information collection unit which extracts the user information at the time of a response or at the time of a call setup, received from the communication terminal via the communication network, and collects the status information contained in this user information.

7. A communication terminal whose status is managed by a management terminal via a communication network which communication terminal is provided with an information analyzing unit which extracts information for users, which is a user-use information signal, at the time of a call setup from the management terminal and identifies a type of status to be notified by a status information signal and whether the user-use information signal indicates a request for transmission of the status-information signal or a request for suspension of transmission of the status information signal, a status supervising and holding unit which supervises the status of each of various parts in said communication terminal and collects and holds the thus supervised status, as the status information, and a status information transmitting unit which adds said status information to the user-use information signal sent at the call setup, which status information is generated according to the type of the status information held in the status supervising and holding unit at the time of detection of a specific phenomenon and analyzed by the information analyzing unit, and transmits the user-use information accompanying the thus generated status information.

8. A communication terminal as set forth in claim 7, further provided with an abnormality cause analyzing unit for analyzing the cause of an abnormal state when detecting abnormal state where the status information transmitted by the communication terminal from the status information transmitting unit is not normally received at the management terminal and a retransmission processing unit for performing processing for retransmitting the status information from the status information transmitting unit based on the result of analysis of the cause of the abnormal termination in this abnormality cause analyzing unit.

9. A communication terminal as set forth in claim 7, further provided with a priority selection unit which selects status information of a priority from status information concerning the contents of failures when the simultaneous occurrence of several types of failures has been detected and causes the selected status information to be transmitted from the status information transmitting unit to the management terminal.

* * * * *